May 22, 1934.   H. D. CHURCH   1,960,140
HEAVY DUTY AUTOMOBILE CONSTRUCTION
Original Filed April 20, 1929
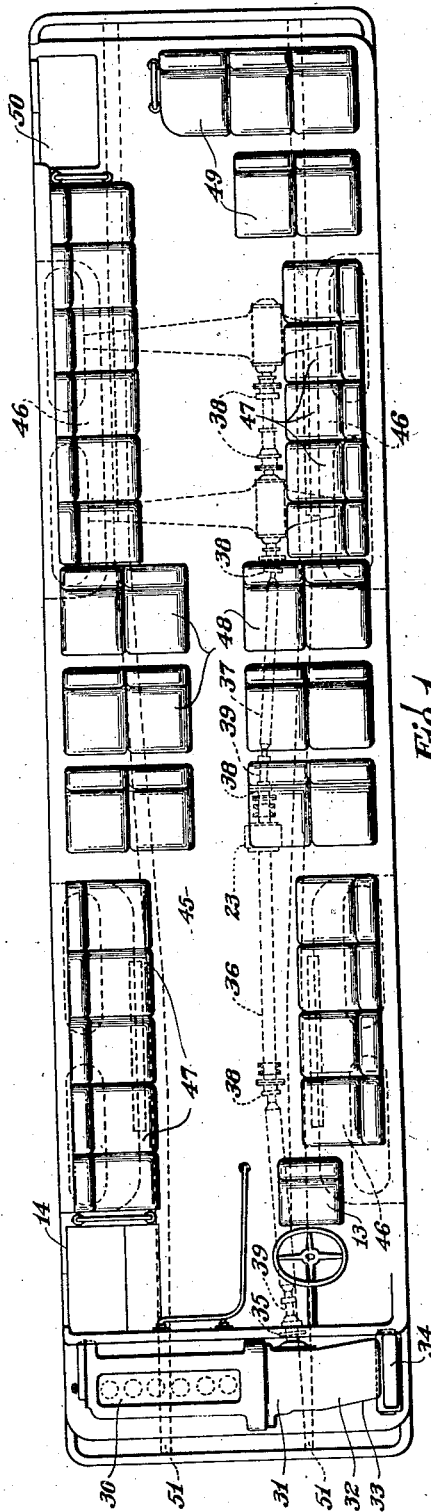
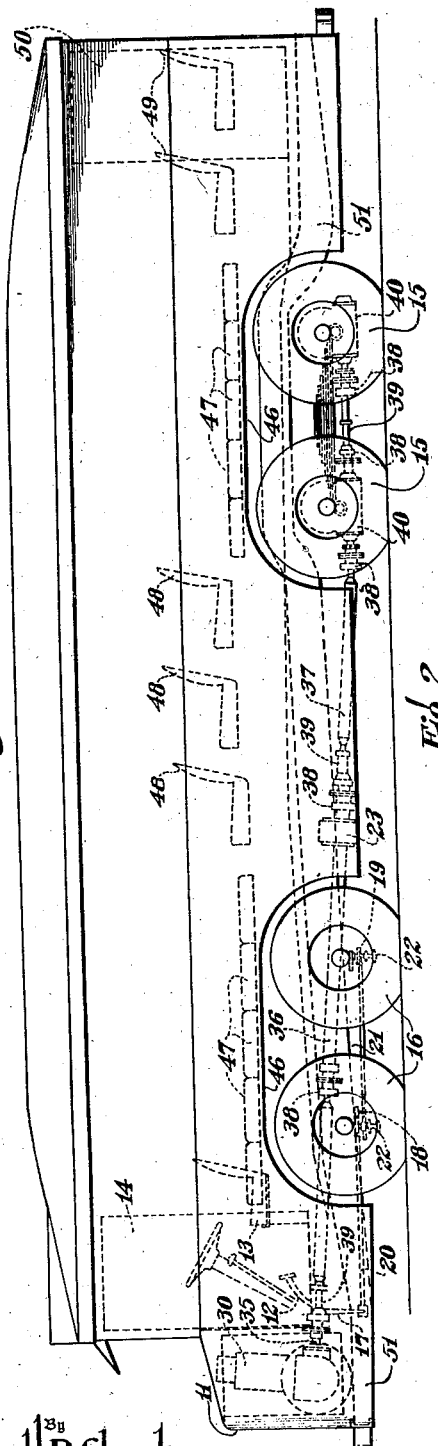
Harold D. Church.
Inventor
Attorneys Patented May 22, 1934

1,960,140

UNITED STATES PATENT OFFICE 1,960,140

HEAVY DUTY AUTOMOBILE CONSTRUCTION

Harold D. Church, Cleveland, Ohio, assignor to The White Motor Company, Cleveland, Ohio, a corporation of Ohio Original application April 20, 1929, Serial No. 356,686. Divided and this application February 18, 1933, Serial No. 657,355

4 Claims. (Cl. 180—54)

This invention relates to automobiles of the heavy duty type, ordinarily provided with more than four wheels, and is particularly directed to large automobile busses.

Among the objects of my invention are the provision of an automobile bus wherein a novel arrangement of the body, seats, and other elements of the bus and grouping of the wheels affords large passenger capacity with respect to overall length with a substantially level floor and uninterrupted aisle and a fairly uniform distribution of weight over a relatively extensive road area. In addition, the invention contemplates a desirable arrangement of the power plant and the accomplishment of highly efficient results in the application of power, in the changing of speeds, in steering, and in braking.

This application is a division of my Patent No. 1,900,484, issued March 7, 1933, granted on application Serial No. 356,686, filed April 20, 1929.

The bus herein disclosed as a preferred embodiment of my invention is known as the trolley type, designed along the lines of a street railway car, presenting a similar general appearance, and having its wheels arranged in groups at either end after the manner of railway car trucks, although the axles are permanently secured transversely to the chassis following the customary automobile practice, so that the vehicle is not actually carried on bogey trucks.

Objects and advantages of my invention beyond those mentioned above will be apparent from the following specification taken in conjunction with the accompanying drawing of a preferred embodiment thereof.

In the drawing:

Fig. 1 is a plan view of an automobile bus embodying the principles of my invention, the roof and hood cover being removed.

Fig. 2 is a side elevation of the same bus.

Referring particularly to Fig. 1, it will be seen that the bus is rectangular in body plan and in the illustrated embodiment has the power plant arranged transversely under a relatively short hood 11 across the entire front of the vehicle. Immediately behind the engine compartment, and thus located substantially at the front end of the bus, is the driver's compartment including controls 12 and a driver's seat 13, located at one side, usually the lefthand side, of the bus laterally. To the right of the driver's seat is a passenger entrance 14 preferably including a door and one or more steps leading down from the floor level.

While I do not restrict myself to any particular number of wheels, the present preferred embodiment is shown and described as provided with eight wheels arranged four at each end. Power is applied only to the four rear wheels 15, and the steering is entirely accomplished by the four front wheels 16. The steering gear includes successive knuckles 17, 18 and 19, connected by longitudinal tie rods 20 and 21. The drop of the front axles 22 allows clearance for the steering gear. All eight wheels are equipped with brakes, which may be either power or hand operated, in addition to which there is a brake 23, on the propeller shaft.

The power plant comprises an engine 30 of suitable character, a clutch 31, and speed change transmission gearing 32, all mutually coaxial, placed, in the present showing, from right to left in the order named. The left end of the transmission case 33 is inclined to the rear to fit the gearing layout therein. The top of the engine is tilted slightly backward (as shown in Fig. 2) to produce a nearly straight line drive thru the propeller shaft, thus eliminating as much as possible unnecessary wear on universal joints. In a general sense the propeller shaft is placed at right angles to the axis of the power plant, although the exact angle between the power shaft and the propeller shaft may vary slightly from 90 degrees to conform to the design of the body and running gear.

The radiator 34, in the instant design is mounted in the left side of the hood, beyond the transmission case 33 having its face to the side of the vehicle. Suitable arrangements for directing air through the radiator, not shown in detail, are provided.

On account of the transverse mounting of the power plant, the propeller shaft 35 extends rearwardly from a point intermediate the clutch 31 and the transmission gearing 32, and to the left of the center line of the vehicle. In the present showing the shaft 35 is not parallel to the center line of the vehicle, but inclines inwardly about five degrees to give proper clearance to propeller shaft sections 36 and 37 further to the rear. However, this is a detail which may be modified according to the various design factors in any individual case, without departing from the spirit of my invention. To meet such requirements as keeping the floor level low, clearing the running gear of the front wheel group, and so on, the propeller shaft is constructed in a number of sections such as 36 and 37, connected by universal joints 38 and sliding sleeves 39, adjacent sections being relatively inclined as the necessities of design may require. Underslung worm drives 40 connect the propeller shaft with each rear axle.

Referring particularly to Fig. 2, it will be seen that the chassis consists of two longitudinal channel bar side rails 51 extending the full length of the bus. These side rails are closer spaced in front than in rear, and are shaped to clear the running gear. The axles supporting the chassis are arranged longitudinally thereof in spaced relation with respect to each end of the chassis to equalize load distribution.

The body, as previously described is rectangular in plan, and extends longitudinally substantially the full length of the chassis, also laterally for distances at least as great as the lateral extent of the wheels, affording large passenger capacity. The body is constructed and mounted upon the chassis in such a manner as to provide a substantially level floor throughout.

The sides of the body are recessed to form wheel housings 46, which provide adequate clearance for the running gear within the lateral limits of the body. The upper portion of the wheel housings project upwardly into the body compartment above the floor line, over which longitudinally disposed seats 47 are placed. Intermediate the wheel housings, where the unbroken floor line is available, laterally disposed seats 48 are placed.

The portion of the body overhanging the rear axle is provided with laterally disposed seats 49 and an emergency exit 50. The portion of the body overhanging the front axle provides a driver's compartment including the driver's seat 13, control 12 and the passenger entrance 14.

The seating arrangement, as herein described, provides adequate clearance or foot room around the wheel housings for the passengers occupying the laterally disposed seats 48 and 49 and also permits a substantially level unobstructed aisle 51 extending throughout the length of the bus, communicating with the front passenger entrance and the rear emergency exit.

It will be seen from the foregoing that I have invented a bus of the trolley car type providing a maximum of passenger capacity in proportion to the ground space occupied, providing efficient distribution of load, of tractive and steering grip upon the road, having a low center gravity, and having the power plant so arranged as to economize space, and particularly to save length, but without sacrificing the accessibility of the machinery.

It is to be understood that I do not limit myself to the specific form of my invention herein shown and described but that it is susceptible of various modifications, all within the scope of the appended claims.

What I claim is:

1. In a motor vehicle, a frame comprising a pair of longitudinal side rails, a plurality of pairs of wheels flanking and supporting said frame and spaced apart at points intermediate the length of said side rails in such a manner that said frame overhangs the foremost pair of wheels, a body carried by said frame and extending longitudinally substantially the full length thereof and overhanging said side rails laterally for distances at least as great as the lateral extent of said wheels, said body being recessed and restricted laterally to accommodate the foremost pair of wheels, a driver's compartment in said body carried by the overhang of said side rails and positioned forwardly of the restricted portion of the body, and an engine extending transversely of the side rails positioned forwardly of said driver's compartment.

2. In a motor vehicle, a frame comprising a pair of longitudinal side rails, a plurality of pairs of wheels flanking and supporting said frame and spaced apart at points intermediate the length of said side rails in such a manner that said frame overhangs the foremost pair of wheels, a body carried by said frame and extending longitudinally substantially the full length thereof and overhanging said side rails laterally for distances at least as great as the lateral extent of said wheels, said body being recessed and restricted laterally to accommodate the foremost pair of wheels, a driver's compartment in said body carried by the overhang of said side rails and positioned forwardly of the restricted portion of the body, and an engine and a selective change speed transmission assembled in alignment and arranged transversely of the side rails forwardly of said driver's compartment.

3. An automobile bus comprising a chassis, a plurality of sets of front and rear wheels on which said chassis is mounted, a transversely disposed motor at the forward end of the chassis, a bus body mounted on said chassis and extending longitudinally the full length thereof, said body being provided with a driver's compartment in advance of the front wheels, and a motor housing in advance of said compartment, that portion of the body which overlies said wheels being formed as a housing for the latter, the body intermediate said front and rear sets of wheels being provided with laterally disposed seats and over said wheel housing being provided with longitudinal seats.

4. In a motor vehicle, a chassis, a plurality of sets of front and rear wheels on which said chassis is mounted, a transversely positioned engine at the forward end of the chassis in advance of said front wheels, a drive shaft extending from said engine to a differential supported by said rear wheels, said shaft and engine being positioned at an incline to transmit the drive in a straight line from the front end of the chassis to said rear wheels.

HAROLD D. CHURCH.